United States Patent [19]

Gibson

[11] Patent Number: 5,527,022
[45] Date of Patent: Jun. 18, 1996

[54] CUTTING BOARD

[75] Inventor: Jeremy H. Gibson, Eastlake, Ohio

[73] Assignee: Faye F. Chen, Ann Arbor, Mich.

[21] Appl. No.: 339,349

[22] Filed: Nov. 14, 1994

[51] Int. Cl.⁶ ........................................... B23Q 3/00
[52] U.S. Cl. ...................... 269/13; 269/289 R; 269/302.1
[58] Field of Search ............................ 269/13, 15, 302.1, 269/289 R, 54.5

[56]  References Cited

U.S. PATENT DOCUMENTS

| 4,798,372 | 1/1989 | Tingle | 269/289 R |
| 5,121,909 | 6/1992 | Stickel | 269/289 R |
| 5,366,208 | 11/1994 | Benjamin | 269/302.1 |

FOREIGN PATENT DOCUMENTS 2260259  10/1975  France ................. 269/302.1

Primary Examiner—Robert C. Watson
Attorney, Agent, or Firm—Frank B. Robb; Robb & Robb

[57] ABSTRACT

A cutting board for cutting food articles comprising a relatively flat rectangular body with a handle, a cutting surface, a bottom surface, a juice channel, a sloping guide plane and leveling means. The cutting surface is curved to allow fluid to flow into the juice channel, the juice channel having grooves to allow fluid in the juice channel to be poured out. Raised teeth protruding from the cutting surface grip the article being cut. After the article is cut, it is guided off the cutting board by way of the shovel chute.

6 Claims, 1 Drawing Sheet

CUTTING BOARD

BACKGROUND OF THE INVENTION

The present invention generally relates to cutting boards used to cut food articles such as vegetables, fruits and meat.

When using cutting boards to cut food articles, safety and cleanliness are major concerns. Obviously, when using any sharp instrument, like a knife or cleaver, proper precautions should be employed to assure that the article being cut does not move during the cutting process. Any slipping or shifting of the article may cause severe or even catastrophic injury to the person doing the cutting. The juices from the article being cut not only promote the slipping and shifting but may also flow from the cutting board to surrounding areas and floor creating an unclean and unsafe environment. While cutting boards used for cutting food articles are not new, they do not provide an effective means for securely holding the article being cut and for channeling or directing the juices in a manner to avoid creating an unsafe or unclean environment.

Consequently, a need exists for improvement in cutting boards which improvement would eliminate the drawbacks associated therewith.

SUMMARY OF THE INVENTION

The present invention provides a cutting board designed to satisfy the aforementioned need.

Accordingly, the present invention relates to a cutting board which comprises a relatively flat rectangular body having a cutting surface and a bottom surface. The cutting surface has a juice channel indented therein with the juice channel being spaced from and parallel to three sides of the body. The cutting surface is slightly curved so that fluid on the cutting surface will flow into the juice channel. A sloping guide plane is formed is formed in the fourth side of the body. Grooves extend from the ends of the juice channel to the side of the body. The grooves are shallower than the juice channel. A plurality of raised cones protrude from the cutting surface to grip the article being cut.

BRIEF DESCRIPTION OF THE DRAWINGS

Further features of the present invention will become apparent to those skilled in the art to which the present invention relates from reading the following specification with reference to the accompanying drawings in which.

DESCRIPTION OF THE PREFERRED EMBODIMENT

Figure 1:
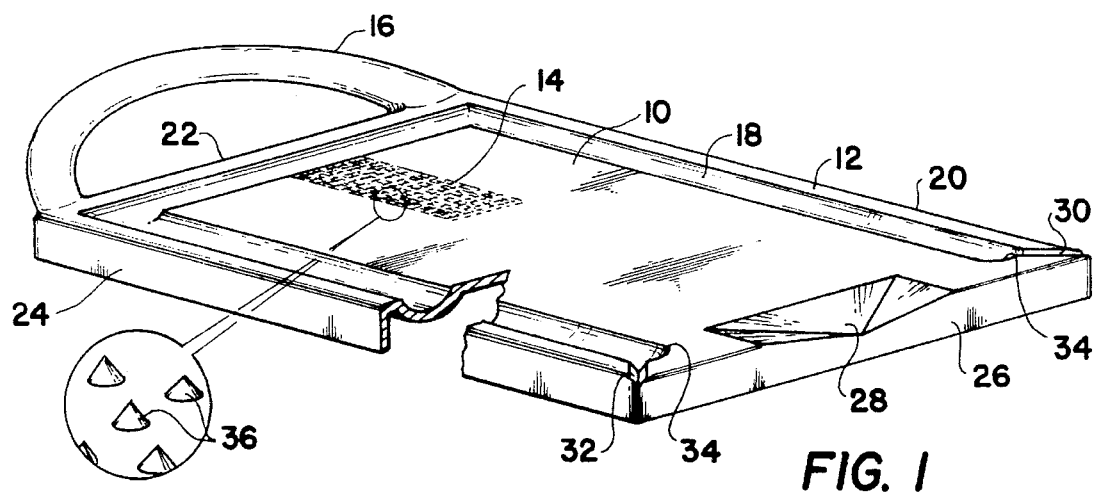
FIG. 1 is a perspective view of a cutting board of the present invention.

Referring now to the drawings and more particularly FIG. 1, there is shown a cutting board 10 comprised of a relatively flat rectangular body 12 having a cutting surface 14. A handle 16 is attached to the body 12. A juice channel 18 is indented in the cutting surface 14 and spaced from and parallel to three sides 20, 22 and 24, respectively, of the body 12. The fourth side 26 of the body 12 has a sloping guide plane 28 formed in it. Advantageously, the handle 16 is attached to the side 22 of the body 12 opposite to the sloping guide plane 28. Grooves 30 and 32 extend from the ends 34 and 36 of juice channel 18 to the point where sides 20 and 24, respectively, meet side 26. The sloping guide plane 28 is therefore, located between the grooves 30 and 32. The grooves 30 and 32 are shallower than the juice channel 18. A plurality of raised cones 36 protrudes from the cutting surface 14. The cutting surface 14 is slightly curved to allow fluids to flow to the juice channel 18.

The cutting board 10 can be used for cutting food articles such as vegetables, fruits, meat, etc. When such articles are cut on the cutting board 10, the fluid emanating from the articles being cut will flow into the juice channel 18. After cutting, the fluid can be poured out of the juice channel 18 through the grooves 30 and 32 by tilting the body 12. The raised cones 36 grip the article being cut and prevent it from sliding or shifting on the cutting surface 14 or sliding off of the body 12. After cutting, the cut article can be guided off the cutting surface 14 by way of the sloping guide plane 28.

Figure 2:
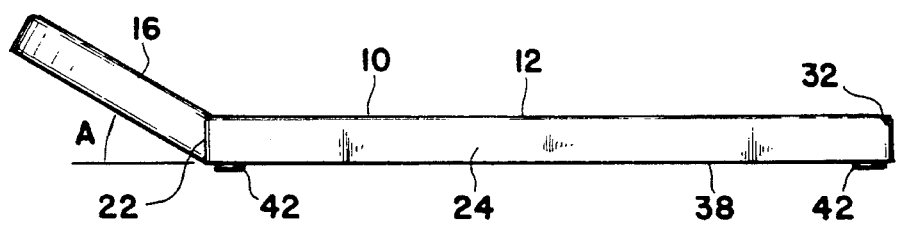
FIG. 2 is a side elevation of the cutting board of the present invention..

Referring now to FIG. 2, the handle 16 is shown sloping upward from one side 22 of the body 12 at a suitable angle of inclination A, for example: about 30 degree angle from the body 12. The angle of inclination A provides a convenient angle for holding the cutting board 10.

Figure 3:
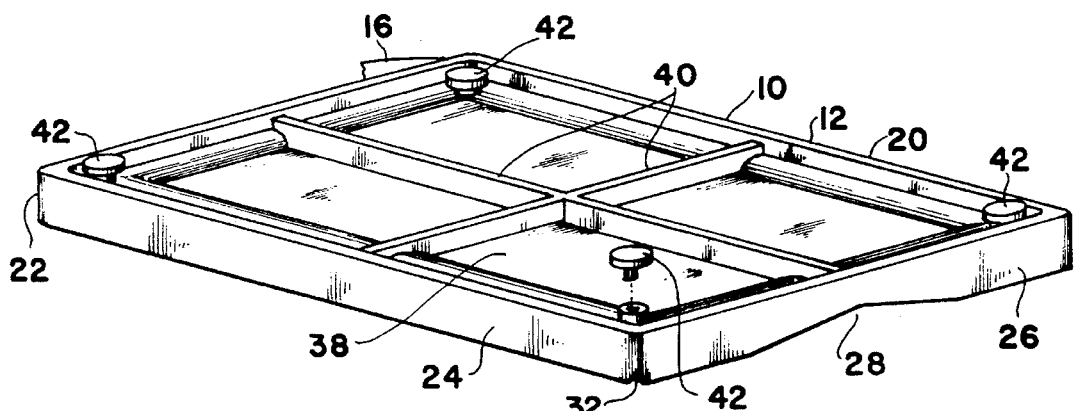
FIG. 3 is a back elevation of the cutting board of the present invention.

Referring now to FIG. 2 and FIG. 3, the bottom surface 38 of the body 12 is shown. Intersecting ribs 40 are located on The bottom surface.38 to provide structural strength to the body 12. Leveling means 42 is fastened to the bottom surface 38. The leveling means 42 maintains the cutting board 10 in a level orientation and provides support and stability for the cutting board 10 when it is located on a flat surface. Advantageously, the leveling means 42 is composed of a flexible friction material such as rubber, and is located at the four corners formed by the sides 20, 22, 24 and 26 of the body 12.

What is claimed is:

1. A cutting board, comprising:

a relatively flat rectangular body having a cutting surface and a bottom surface;

said cutting surface having a juice channel indented therein, said juice channel spaced from and parallel to three sides of said body, said cutting surface slightly curved so that fluid on said cutting surface will flow into said juice channel;

a sloping guide plane formed in the fourth side of said body;

grooves extending from the ends of said juice channel to the side of said body, said grooves being shallower than said juice channel;

a plurality of raised cones protruding from said cutting surface to grip the article being cut, and leveling means fastened to said bottom surface so that said cutting board is maintained in a level orientation when on a support surface.

2. The cutting board of claim 1 further comprising a handle connected to said body.

3. The cutting board of claim 2 wherein said handle is angled upward above said cutting surface.

4. The cutting board of claim 3 wherein said handle is angled upward at about 30 degrees from said cutting surface.

5. The cutting board of claim 1 wherein said leveling means is composed of flexible friction material.

6. The cutting board of claim 1 further comprising intersecting ribs attached to said bottom surface of said body.

* * * * *